United States Patent [19]

Berryer

[11] Patent Number: 5,066,170
[45] Date of Patent: Nov. 19, 1991

[54] TOOL BIT

[75] Inventor: Michel Berryer, Cadillac, Mich.

[73] Assignee: Outboard Marine Corporation, Waukegan, Ill.

[21] Appl. No.: 684,432

[22] Filed: Apr. 10, 1991

Related U.S. Application Data

[63] Continuation of Ser. No. 407,331, Sep. 14, 1989, abandoned, which is a continuation-in-part of Ser. No. 252,595, Oct. 3, 1988, abandoned.

[51] Int. Cl.$^5$ .............................................. B26D 1/12
[52] U.S. Cl. ..................................... 407/54; 407/118; 408/229
[58] Field of Search ............... 407/33, 118, 119, 113, 407/53-62; 408/229, 228, 227, 704

[56] References Cited

U.S. PATENT DOCUMENTS

| | | | |
|---|---|---|---|
| 2,930,264 | 3/1960 | Louret | 408/229 |
| 3,857,305 | 12/1974 | Lichtman | 76/ |
| 4,412,763 | 11/1983 | Shallenberger, Jr. | 408/ |
| 4,525,110 | 6/1985 | Stojanovski | 407/ |
| 4,588,331 | 5/1986 | Yoshinori | 407/ |
| 4,593,734 | 6/1986 | Wallace | 144/ |
| 4,722,644 | 2/1988 | Scheuch | 408/704 |

FOREIGN PATENT DOCUMENTS 0570907 2/1933 Fed. Rep. of Germany ...... 408/229

0278711 11/1988 Japan .

Primary Examiner—James G. Smith
Assistant Examiner—Lawrence Cruz
Attorney, Agent, or Firm—Michael, Best & Friedrich

[57] ABSTRACT

Disclosed herein is a tool bit comprising a shank including a cylindrical base portion having an axis and a diameter, an elongated end portion of generally cylindrical shape and having an axis extending coaxially with the axis of the base portion, a diameter less than the diameter of the base portion, and an outer cylindrical periphery, which shank end portion includes therein a recess extending lengthwise of the end portion and being of right angle shape in a cross-section extending transversely of the end portion axis, which recess cross-section is defined by a long face extending in parallel spaced relation to a radius extending from the end portion axis and including an outer end at the cylindrical outer periphery and an inner end, and a short face extending from the inner end to the cylindrical outer periphery, and a connecting portion joining the end portion and the base portion and tapering from the base portion diameter to the end portion diameter, and a carbide insert brazed in the recess and having a transverse generally rectangular cross-section with a length extending along the short face and beyond the outer cylindrical periphery of the end portion, which carbide insert is sharpened to provide a cutting edge.

17 Claims, 2 Drawing Sheets

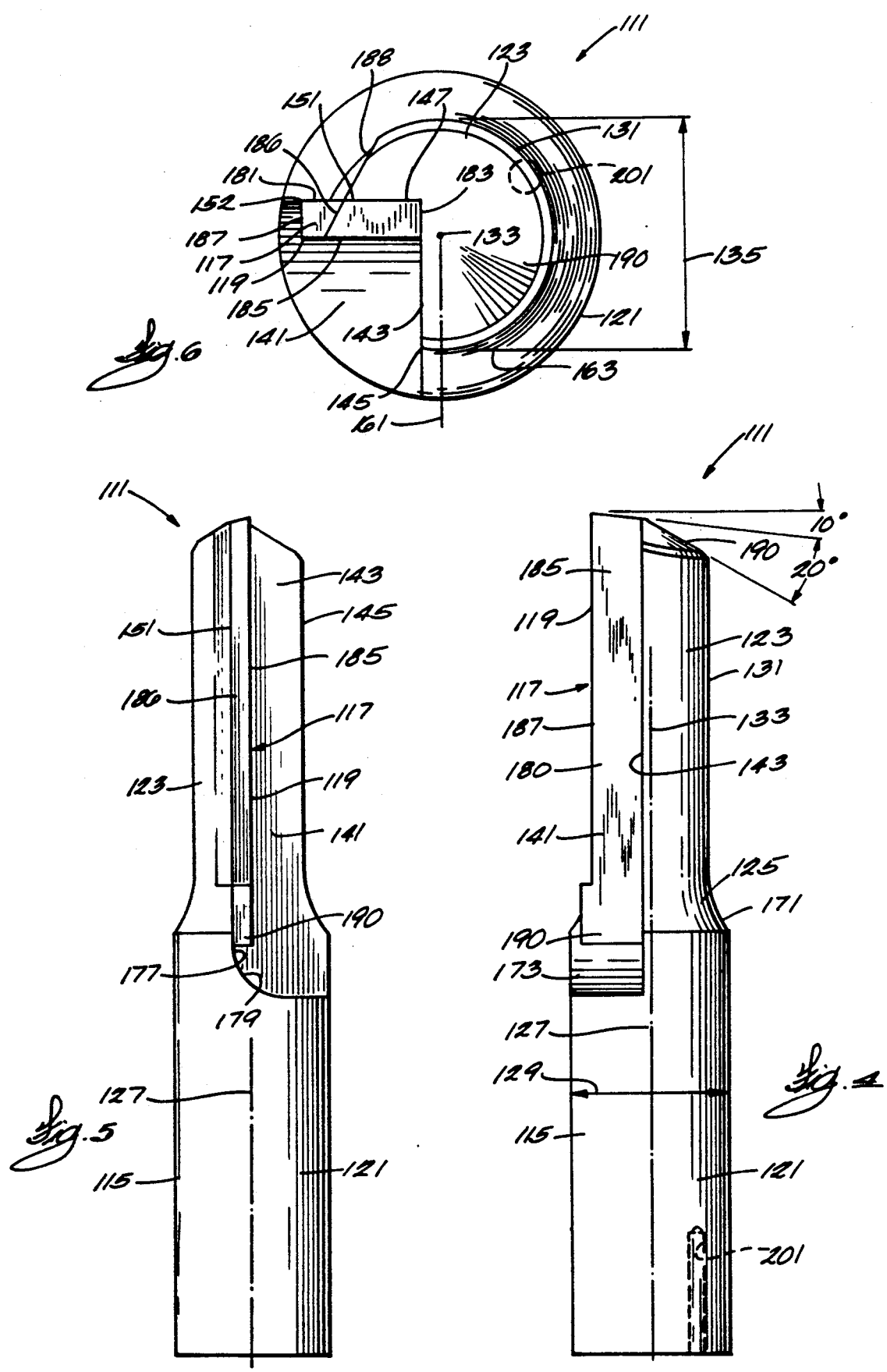

TOOL BIT

This is a continuation of Ser. No. 407,331 filed on Sept. 14, 1989, now abandoned, which is a continuation-in-part of Ser. No. 252,595 filed Oct. 3, 1988, now abandoned.

BACKGROUND OF THE INVENTION

The invention relates generally to router tool bits and especially to such tool bits intended to provide relatively large holes or slots in a substantial thickness of plywood.

Presently commercially available one half inch router bits are not well suited for cutting at high speeds, i.e., 400 or more inches per minute, of one half inch holes or slots through one and one half inches of solid or layered plywood. Such presently commercial router bits readily break under such loading because of the bending loads applied to the bits.

Attention is directed to the following U.S. Pat. Nos.:

| Lichtman | 3,857,305 |
| Shallenberger | 4,412,763 |
| Stojanoviski | 4,525,110 |
| Yoshinori | 4,588,331 |
| Wallace | 4,593,734 |

The invention disclosed hereinafter is intended to overcome this deficiency by providing a one half inch router bit which will effectively cut through one and one half inches of plywood, either in the form of a single sheet or in the form of a stacked series of sheets.

SUMMARY OF INVENTION

The invention provides a tool bit comprising a shank including a cylindrical base portion having an axis and a diameter, an elongated end portion of generally cylindrical shape and having an axis extending coaxially with the axis of the base portion, a diameter less than the diameter of the base portion, and an outer cylindrical periphery, which end portion includes therein a recess extending lengthwise of the end portion and being of right angle shape in a cross-section extending transversely of the end portion axis, which recess cross-section is defined by a long face extending in parallel spaced relation to a radius extending from the end portion axis and including an outer end at the cylindrical outer periphery and an inner end, and a short face extending from the inner end to the cylindrical outer periphery, and a connecting portion joining the end portion and the base portion and tapering from the base portion diameter to the end portion diameter, and a carbide insert brazed in the recess and having a transverse generally rectangular cross-section with a length extending along the short face and beyond the outer cylindrical periphery of the end portion, which carbide insert is sharpened to provide a cutting edge.

In one embodiment of the invention, the shaft is fabricated of "Sheffield #20 T.G.P." shafting.

In one embodiment of the invention, the connecting portion includes an outwardly concave tapering surface having an exponential profile with a minimum radius adjacent the base portion and a maximum radius adjacent the end portion.

In one embodiment of the invention, the carbide insert includes an end portion including a flat exposed surface and an inner surface which is bonded to the shank and which has a first part extending in spaced parallel generally parallel relation to the exposed surface and a second part which curves from the first part toward and intersects with the exposed surface.

In one embodiment of the invention, the connecting portion includes a recess extension which is defined by a flat surface and a curving surface to which the end portion of carbide insert is bonded.

In one embodiment of the invention, the carbide insert includes an inner edge surface in engagement with the long surface of the recess in the end portion and an outer edge surface which extends parallel to the inner edge surface and from a shoulder adjacent to the end portion of the carbide insert.

The invention also provides a tool bit comprising a shank fabricated of "Sheffield #20 T.G.P." steel and including a cylindrical base portion having an axis and a diameter, an elongated end portion of generally cylindrical shape and having an axis extending coaxially with the axis of the base portion, a diameter less than the diameter of the base portion, and an outer cylindrical periphery, which end portion includes therein a recess extending lengthwise of the end portion and being of right angle shape in a cross-section extending transversely of the end portion axis, which recess cross-section is defined by a long face extending in parallel spaced relation to a radius extending from the end portion axis and including an outer end at the cylindrical outer periphery and an inner end, and a short face extending from the inner end to the cylindrical outer periphery, and a connecting portion joining the end portion and the base portion and tapering from the base portion diameter to the end portion diameter, which connecting portion includes an outwardly concave tapering surface having an exponential profile with a minimum radius adjacent the base portion and a maximum radius adjacent the end portion, which connecting portion also includes a recess extension defined by a flat surface extending from the short face, and a curving surface extending from the long face, and an insert fabricated of carbide and having a transverse generally rectangular cross-section with a length extending along the short face and beyond the outer cylindrical periphery of the end portion, which insert includes a main portion in the recess in the shank end portion and including an exposed flat surface, an inner flat surface brazed to the short face of the recess, an inner edge surface brazed to the long face of the recess, and an outer edge surface which extends parallel to the inner edge surface, which insert also includes an end portion extending from the main portion and including a flat exposed surface extending from the exposed surface of the main portion, and an inner surface which is brazed to the shank and which has a first part extending in spaced generally parallel relation to the exposed surface of the end portion and a second part which curves from the first part toward, and intersects with, the exposed surface of said insert end portion, which insert is sharpened to provide a cutting edge.

In one embodiment of the invention, the curved part extends about a constant radius.

In one embodiment of the invention, the diameter of the base portion is about 0.750 inches, the said diameter of the shank end portion is about 0.470 inches, and the cutting edge is about 0.250 inches from the axis of the shank end portion.

Other features and advantages of the invention will become apparent to those skilled in the art upon review of the following detained description, claims and drawings.

IN THE DRAWINGS

FIG. 4 is a side view of a second embodiment of a router tool bit embodying various of the features of the invention.

FIG. 5 is a view which is similar to FIG. 4 and which is taken at a ninety degree (90°) angle from the FIG. 4 view.

FIG. 6 is a top end view of the tool bit shown in FIG. 4.

Figure 3:
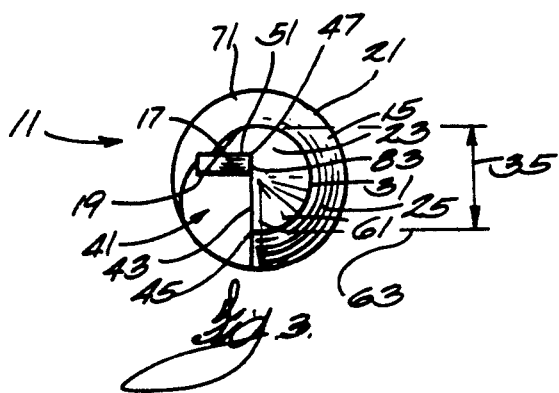
FIG. 3 is a top end view of the tool bit shown in FIG. 1.

Before one embodiment of the invention is explained in detail, it is to be understood that the invention is not limited in its application to the details of the construction and the arrangements of components set forth in the following description or illustrated in the drawings. The invention is capable other embodiments and of being practiced or being carried out in various ways. Also, it is to be understood that the phraseology and terminology used herein is for the purpose of description and should not be regarded as limiting.

GENERAL DESCRIPTION

Shown in the drawings is a router tool bit 11 which includes a shaft 15 and a carbide insert 17 having a cutting edge 19.

The shaft 15 is preferably fabricated from Sheffield #20 T.G.P. shafting (available from the North American Steel Company of Cleveland, Ohio) and includes a base portion 21, and an elongated end portion 23, and a connecting portion 25 joining the base portion 21 and the end portion 23.

More specifically, the base portion 21 is generally cylindrical in shape, having an axis 27 and a diameter 29 which, in the preferred and disclosed construction, is about 0.750 inches. The base portion can have any suitable length and, in the disclosed construction, has a length of about 1.680 inches.

The elongated end portion 23 has a generally cylindrical outer periphery 31, an axis 33 extending coaxially with the axis 27 of the base portion 21, and a diameter 35 which is substantially less then the diameter 29 of the base portion 21 and which, preferably, is about 0.470 inches. The end portion 23 can have any suitable length and, in the disclosed construction, is about 1.700 inches long.

The end portion 23 also includes (See FIG. 3) an elongated recess 41 which extends the entire length of the end portion 23, which has a cross-section of right angle shape in the direction transversely of the end portion axis 33, and which is constant for the length of the end portion. More specifically, the recess 41 is defined by a long flat surface 43 having an outer end 45 at the cylindrical outer periphery 31 of the end portion 23 and an inner end 47, and by a short flat surface 51 extending from the inner end 47 of the long surface 43 and having an outer end extending beyond the cylindrical outer periphery 31 of the end portion 23.

The long surface 43 extends in parallel and spaced relation to a radius 61 extending from the axis 33 of the end portion 23. In the preferred construction, the spacing of the long surface 43 from the radius 61 is about 0.050 inches and the inner end 47 of the long surface 43 is spaced about 0.350 inches from a tangent line 63 extending from the intersection of the radius 61 and the cylindrical outer periphery 31 of the end portion 23.

The connecting portion 25 is relatively short and, in the disclosed construction, is about 0.400 inches long, and tapers from the diameter 29 of the base portion 21 to the diameter 35 of the end portion 23. The tapering connecting portion 25 includes an outer surface 71 which is preferably outwardly concave with an exponential profile having a minimum radius adjacent the base portion 21 and having a maximum radius adjacent the end portion 23.

The connecting portion 25 also includes a recess extension 73 which extends from the recess 41 and which is defined by a flat surface extending in coplanar relation to the recess surface 51 and a second surface which extends at a right angle to the flat surface and which includes a portion 77 extending in coplanar relation to the recess surface 43 and a portion 79 which curves from the flat portion 77, and which extends to the outer periphery of the shaft 15 at about the junction of the base portion 21 and the connecting portion 25. Preferably the radius of the curved surface portion 79 is constant and about 0.050 inches.

The carbide insert 17 is preferably a substantially rectangular bar of carbide, such as OM2 carbide, and is fixed in the recess 41 and recess extension 73. The insert 17 includes a main portion 80 having a cross-section transverse to the axes 27 and 33, which cross-section has a long surface or length defining an inner long surface 81 which is brazed to the short surface 51 of the recess 41 and a width or short surface defining an inner short surface 83 which is brazed to the innermost part of the recess surface 43 adjacent to the inner end 47. The carbide insert 17 also includes an exposed wide surface 85 extending generally parallel to said inner long surface 81 and an exposed narrow surface 87 extending in spaced relation to the inner short surface 83. The intersection of the exposed wide surface 85 and the exposed narrow surface 87 defines the cutting edge 19. The length of the cross-section extends beyond the cylindrical outer periphery 31 of the end portion 23 so that the cutting edge 19 is about 0.250 inches from the end portion axis 33.

The main portion 80 of the carbide insert 17 preferably also extends somewhat into the recess extension 73 in the connecting portion 25. In addition, the carbide insert 17 includes a root or end portion 90 which is located in the recess extension 73, and which includes surfaces coplanar with the surfaces of the main portion. In addition, the root or end portion 90 is also defined by a curving surface which extends tangentially from the inner surface 81 of the main portion 80 and which preferably curves at a uniform radius equal to the radius of the curved surface portion 79 of the recess extension 73 and until termination at the exposed surface 85.

The outer end of the end portion 23 and the carbide insert 17 can be conventionally sharpened as illustrated to provide the desired cutting edge.

In the brazing process, the shaft 15 is slowly heated to, but not above, about 1,100 degrees Fahrenheit. The carbide insert 17 is then brazed to the shaft end portion 23 in such manner as to allow the brazing medium to fully contact the mating surfaces of the carbide insert 17 and the shaft 15 and thereby to avoid voids in the bond.

After the braze solidifies, and the assembled tool bit 11 cools to hand warm, the bit 11 can then be slowly heated in an electric or other oven to about 450 degrees Fahrenheit and held at that temperature for 45 minutes to provide stress relief. Thereafter, the bit is cooled slowly and tempered at 400 degrees Fahrenheit for 30 minutes after which the bit 11 is allowed to cool in the air. After such cooling, the carbide insert 17 can be ground as shown in the drawings.

Shown in FIGS. 4 through 6 of the drawings is another embodiment of a router tool bit 111 which embodies various of the features of the invention and which includes a shaft 115 and a carbide insert 117 having a cutting edge 119.

The shaft 115 is preferably fabricated from Sheffield #20 T.G.P. shafting (available from the North American Steel Company of Cleveland, Ohio) and includes a base portion 121, and an elongated end portion 123, and a connecting portion 125 joining the base portion 121 and the end portion 123.

More specifically, the base portion 121 is generally cylindrical in shape, having an axis 127 and a diameter 129 which, in the preferred and disclosed construction, is about 0.750 inches. The base portion 121 can have any suitable length.

The elongated end portion 123 has (See FIG. 6) a generally cylindrical outer periphery 131, an axis 133 extending coaxially with the axis 127 of the base portion 121, and a diameter 135 which is substantially less then the diameter 129 of the base portion 121 and which, preferably, is about 0.470 inches. The end portion 123 can have any suitable length.

The end portion 123 also includes (See FIG. 6) an elongated recess 141 which extends the entire length of the end portion 123, which has a cross-section of right angle shape in the direction transversely of the end portion axis 133, and which is constant for the length of the end portion. More specifically, the recess 141 is defined by a long flat surface 143 having an outer end 145 at the cylindrical outer periphery 131 of the end portion 123 and an inner end 147, and by a short flat surface 151 extending from the inner end 147 of the long surface 143 and having an outer end 152 extending beyond the cylindrical outer periphery 131 of the end portion 123.

The long surface 143 extends in parallel and spaced relation to a radius 161 extending from the axis 133 of the end portion 123. In the preferred construction, the spacing of the long surface 143 from the radius 161 is about 0.060 inches and the inner end 147 of the long surface 143 is spaced about 0.312 inches from a tangent line 163 extending from the intersection of the radius 161 and the cylindrical outer periphery 131 of the end portion 123.

The connecting portion 125 is relatively short and, in the disclosed construction, is about 0.400 inches long, and tapers from the diameter 129 of the base portion 121 to the diameter 135 of the end portion 123. The tapering connecting portion 125 includes an outer surface 171 which is preferably outwardly concave with a profile having a minimum radius adjacent the base portion 121 and having a maximum radius adjacent the end portion 123. The profile can result from either a single constant radius or from a varying or compound radius. Preferably, this outer surface 171 is curved to substantially eliminate stress risers.

The connecting portion 125 and base portion also include (See FIG. 4) a recess extension 173 which extends from the recess 141 and which is defined by a flat surface extending in coplanar relation to the recess surface 143 and a second surface which extends at a right angle to the flat surface and which includes a portion 177 extending in coplanar relation to the recess surface 151 and (See FIG. 5) a portion 179 which curves from the flat portion 177, and which extends to the outer periphery of the base portion in spaced relation to the junction of the base portion 121 and the connecting portion 125. Preferably the radius of the curved surface portion 179 is constant.

The carbide insert 117 is preferably a substantially rectangular bar of carbide, such as OM2 carbide, and is fixed in the recess 141 and recess extension 173. The insert 117 includes a main portion 180 having a cross-section transverse to the axes 127 and 133, which cross-section has (See FIG. 6) a long surface or length defining a long inner surface 181 which is brazed to the short surface 151 of the recess 141 and recess extension 173 and a width or short surface 183 defining an inner short surface which is brazed to the innermost part of the recess surface 143 adjacent the inner end 147. The carbide insert 117 extends beyond the cylindrical outer periphery 131 of the end portion 123 and also includes an exposed wide surface 185 extending generally parallel to the inner or long surface 181 and an exposed narrow surface 187 extending in spaced relation to the inner short surface 183.

The main portion 180 of the carbide insert 117 preferably also extends through the recess extension 173 in the connecting portion and somewhat into the recess extension 173 in the base portion 121. In addition, the carbide insert 117 includes a root or end portion 190 which is located in the recess extension 173, and which includes surfaces coplanar with the surfaces of the main portion. Extension of the carbide insert 117 into the base portion 121 aids in transmitting stress directly to the base portion 121.

The end portion 123 and the carbide insert 117 can be conventionally sharpened as illustrated to provide the desired cutting edge 119. In this regard, the cutting edge 119 is formed by the flat surface 185 and by an inclined surface 186 and a coplanar extension 188 thereof in the end portion 123. The angle between the surfaces 185 and 186 is about 45° and the cutting edge 119 is about 0.250 inches from the end portion axis 133.

The outer end 190 of the end portion 123 is machined to a generally conical formation except that a 10° clearance angle is provided as shown in FIG. 4. In addition, the end portion 123 is machined or ground at an angle to the clearance surface of about 20° as also shown in FIG. 4.

The multiple angle surface at the end 190 of the tool bit 111 facilitates greater efficiency with respect to plunging or boring perpendicularly into the plane of the wood as compared to routing or cutting in and along the plane of the wood.

Figure 2:
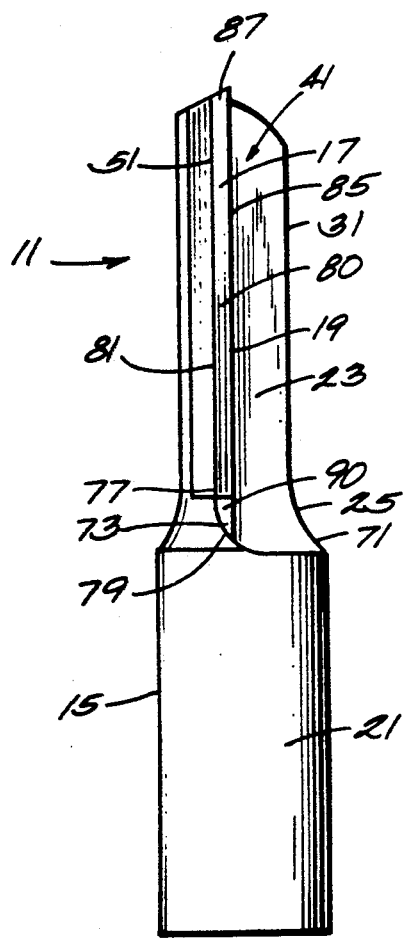
FIG. 2 is a view which is similar to FIG. 1 and which is taken at a ninety degree (90°) angle from the FIG. 1 view.
Figure 1:
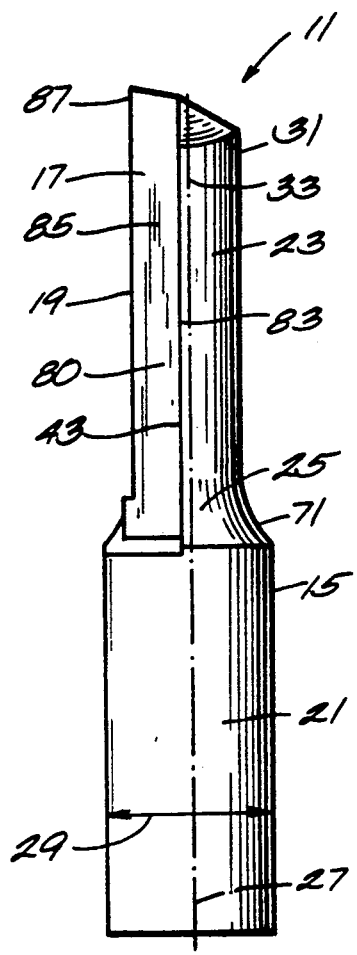
FIG. 1 is a side view of a router tool bit embodying various of the features of the invention.

The insert 117 is brazed to the shaft 115 in the same manner as indicated in connection with the embodiment of FIGS. 1 through 3.

If the tool bit 111 and by location therein of the insert 117, the out-of-balance condition can be substantially reduced or eliminated by drilling an axially extending hole or bore or void 201 in the base portion 121 from the outer end thereof and at a point on a radius extending from the axis 127 through the center of mass. Preferably the recess, void, or bore 201 is about 0.250 inches in diameter and is located at a distance of approximately 0.187 inches from the outer periphery 131 of the base portion 121. Preferably, the bore 201 initially drilled to a depth of about 0.750 inches. If this depth is insufficient to remove any out-of-balance condition, the axial length of the bore can be incrementally increased until a depth of approximately 1.250 inches or until the out-of-balance condition is substantially reduced or eliminated.

Any technique can be employed to locate the radial plane including the center of mass.

Preferably, all of the machining on the brazed tool bit 111 is done cold. Specifically, the tool bit 111 should be capable of being hand held before machining and the machining should be sufficiently slow so that the temperature of the bit is not elevated above temperature permitting hand holding of the tool bit.

The disclosed tool bits 11 and 111 function well in rapid cutting of 0.500 holes or slots in plywood thicknesses of up to 1.500 inches. This capability is thought to be a combined function of at least some of the following features, including the enlarged base portion 121 (preferably with a diameter of about 0.750 inches), the profile of the connecting portion 125, the location of the cutting edge 119 of the insert at a distance of 0.250 inches from the axis 113 of the end portion 123, the rooting of the end portion of the carbide insert 117 in the connecting portion 125 and in the base portion 121, the brazing method including cooling to a hand warm condition before stress relieving, and the use of the Sheffield #20 T.G.P. shafting and the carbide in the insert 117.

Various of the features of the invention are set forth in the following claims.

I claim:

1. A tool bit comprising a shank fabricated of "Sheffield #20 T.G.P." steel and including a cylindrical base portion having an axis and a diameter, an elongated end portion of generally cylindrical shape and having an axis extending coaxially with said axis of said base portion, and an outer cylindrical periphery extending for substantially the entire length of said end portion and having a constant diameter less than said diameter of said base portion, said end portion including therein a recess extending lengthwise of said end portion and being of right angle shape in a cross-section extending transversely of said end portion axis, said recess cross-section being defined by a long face extending in parallel spaced relation to a radius extending from said end portion axis and including an outer end at said cylindrical outer periphery and an inner end, and a short face extending from said inner end to said cylindrical outer periphery, and a connecting portion joining said end portion and said base portion and tapering from said base portion diameter to said end portion diameter, said connecting portion including an outwardly concave tapering surface having an exponential profile with a minimum radius adjacent said base portion and a maximum radius adjacent said end portion, said connecting portion also including a recess extension defined by a flat surface extending from said short face, and a curving surface extending from said long face, and an insert fabricated of carbide and having a transverse generally rectangular cross-section with a length extending along said short face and beyond said outer cylindrical periphery of said end portion, said insert including a main portion in said recess in said end portion of said shank and including an exposed flat surface, an inner flat surface brazed to said short face of said recess, an inner edge surface brazed to said long face of said recess, and an outer edge surface which extends parallel to said inner edge surface, said insert also including an end portion extending from said main portion and including a flat exposed surface extending from said exposed surface of said main portion and an inner surface which is brazed to said shank and which has a first part extending in spaced generally parallel relation to said exposed surface of said insert end portion and a second part which curves from said first part toward, and intersects with, said exposed surface of said insert end portion, said insert being sharpened to provide a cutting edge.

2. A tool bit in accordance with claim 1 wherein said curved part extends about a constant radius.

3. A tool bit in accordance with claim 1 wherein said diameter of said base portion is about 0.750 inches, wherein said diameter of said end portion is about 0.470 inches, and wherein cutting edge is about 0.250 inches from said axis of said shank end portion.

4. A tool bit comprising a shank including a cylindrical base portion having an axis and a diameter, an elongated end portion of generally cylindrical shape and having an axis extending coaxially with said axis of said base portion, and an outer cylindrical periphery extending for substantially the axial length of said end portion and with a constant diameter less than said diameter of said base portion, said end portion including therein a recess extending lengthwise of said end portion and being of right angle shape in a cross-section extending transversely of said end portion axis, said recess cross-section being defined by a long face extending in parallel spaced relation to a radius extending from said end portion axis and including an outer end at said cylindrical outer periphery and an inner end, and a short face extending from said inner end to said cylindrical outer periphery, and a connecting portion joining said end portion and said base portion and tapering from said base portion diameter to said end portion diameter, and a carbide insert brazed in said recess and having a transverse generally rectangular cross-section with a length extending along said short face and beyond said outer cylindrical periphery of said end portion, said carbide insert being sharpened to provide a cutting edge, and said carbide insert including an end portion including a flat exposed surface and an inner surface which is bonded to said shank and which has a first part extending in spaced generally parallel relation to said exposed surface and a second part which curves from said first part toward and intersects with said exposed surface.

5. A tool bit in accordance with claim 1 wherein said shaft is fabricated of "Sheffield #20 T.G.P." shafting.

6. A tool bit in accordance with claim 1 wherein said connecting portion includes an outwardly concave tapering surface having an exponential profile with a minimum radius adjacent said base portion and a maximum radius adjacent said end portion.

7. A tool bit in accordance with claim 1 wherein said curved part extends about a constant radius.

8. A tool bit in accordance with claim 1 wherein said connecting portion includes a recess extension which is defined by a flat surface and a curving surface to which said portion of said carbide insert is bonded.

9. A tool bit in accordance with claim 1 wherein said connecting portion includes a recess extension including a flat wall in register with said short wall of said recess in said end portion and a curved wall which extends from said long wall of said recess in the direction towards that exposed surface of said carbide insert and which extends about a radius substantially equal to the radius of said curved part of said inner surface of said carbide insert.

10. A tool bit in accordance with claim 1 wherein said carbide insert includes an end portion extending into said connecting portion and said base portion.

11. A tool bit in accordance with claim 1 wherein said carbide insert includes an inner edge surface in engagement with said long surface of said recess in said end portion of said shank and an outer edge surface which extends parallel to said inner edge surface and from a shoulder adjacent to said end portion of said carbide insert.

12. A tool bit comprising a shank including a cylindrical base portion having an axis and a diameter, an elongated end portion of generally cylindrical shape and having an axis extending coaxially with said axis of said base portion, and an outer generally cylindrical periphery extending for substantially the axial length of said end portion and with a constant diameter less than said diameter of said base portion, said end portion including therein a recess extending lengthwise of said end portion and being of generally right angle shape in a cross-section extending transversely of said end portion axis, said recess cross-section being defined by a first face extending in generally parallel spaced relation to a radius extending from said end portion axis and including an outer end at said cylindrical outer periphery and an inner end, and a second face extending from said inner end to said cylindrical outer periphery, and a connecting portion joining said end portion and said base portion and tapering from said base portion diameter to said end portion diameter, and a carbide insert brazed in said recess and having a length extending along one of said faces and beyond said outer cylindrical periphery of said end portion, said carbide insert being sharpened to provide a cutting edge, and said carbide insert including an end portion, and an inner edge surface in engagement with the other of said faces of said recess in said end portion and an outer edge surface which extends parallel to said inner edge surface and from a shoulder adjacent to said end portion of said carbide insert.

13. A tool bit comprising a shank including a cylindrical base portion having an axis and a diameter and including an outer end and a void extending inwardly from said outer end and in spaced and parallel relation to said base portion axis for reducing an out of balance condition, and in a plane including the center of mass of said tool bit, an elongated end portion of generally cylindrical shape and having an axis extending coaxially with said axis of said base portion, and an outer cylindrical periphery extending for substantially the axial length of said end portion and with a constant diameter less than said diameter of said base portion, said end portion including therein a recess extending lengthwise of said end portion and being of right angle shape in a cross-section extending transversely of said end portion axis, said recess cross-section being defined by a long face extending in parallel spaced relation to a radius extending from said end portion axis and including an outer end at said cylindrical outer periphery and an inner end, and a short face extending from said inner end to said cylindrical outer periphery, and a connecting portion joining said end portion and said base portion and tapering from said base portion diameter to said end portion diameter, and a carbide insert brazed in said recess and having a transverse generally rectangular cross-section with a length extending along said short face and beyond said outer cylindrical periphery of said end portion, said carbide insert being sharpened to provide a cutting edge.

14. A tool bit in accordance with claim 1 wherein said carbide insert includes an end portion, and an inner edge surface in engagement with said long surface of said recess in said end portion and an outer edge surface which extends parallel to said inner edge surface and from a shoulder adjacent to said end portion of said carbide insert.

15. A tool bit comprising a shank fabricated of "Sheffield #20 T.G.P." steel and including a cylindrical base portion including an axis, a diameter, an outer end and a void extending inwardly from said outer end and in spaced and parallel relation to said base portion axis, and in a plane including the center of mass of said tool bit, an elongated end portion of generally cylindrical shape and having an axis extending coaxially with said axis of said base portion, and an outer cylindrical periphery extending for substantially the entire length of said end portion and having a constant diameter less than said diameter of said base portion, said end portion including therein a recess extending lengthwise of said end portion and being of right angle shape in a cross-section extending transversely of said end portion axis, said recess cross-section being defined by a long face extending in parallel spaced relation to a radius extending from said end portion axis and including an outer end at said cylindrical outer periphery and an inner end, and a short face extending from said inner end to said cylindrical outer periphery, and a connecting portion joining said end portion and said base portion and tapering from said base portion diameter to said end portion diameter, said connecting portion including an outwardly concave tapering surface having an exponential profile with a minimum radius adjacent said base portion and a maximum radius adjacent said end portion, said connecting portion also including a recess extension defined by a flat surface extending from said short face, and a curving surface extending from said long face, and an insert fabricated of carbide and having a transverse generally rectangular cross-section with a length extending along said short face and beyond said outer cylindrical periphery of said end portion, said insert including a main portion in said recess in said end portion of said shank and including an exposed flat surface, an inner flat surface brazed to said short face of said recess, an inner edge surface brazed to said long face of said recess, and an outer edge surface which extends parallel to said inner edge surface, said insert also including an end portion extending from said main portion and including a flat exposed surface extending from said exposed surface of said main portion and an inner surface which is brazed to said shank and which has a first part extending in spaced generally parallel relation to said exposed surface of said insert end portion and a second part which curves from said first part toward, and intersects with, said exposed surface of said insert end portion, said insert being sharpened to provide a cutting edge.

16. A tool bit in accordance with claim 13 wherein said first face is longer than said second face.

17. A tool bit in accordance with claim 12 wherein said periphery of said end portion of said shank includes a flat portion.

* * * * *